Oct. 11, 1960     H. G. ELWELL, JR     2,955,464
TIME OF FLIGHT INDICATOR
Filed Feb. 25, 1955     3 Sheets-Sheet 1

INVENTOR.
HENRY G. ELWELL, JR.
BY
*Tyler S Roundy*
ATTORNEY

Oct. 11, 1960 H. G. ELWELL, JR 2,955,464
TIME OF FLIGHT INDICATOR
Filed Feb. 25, 1955 3 Sheets-Sheet 2
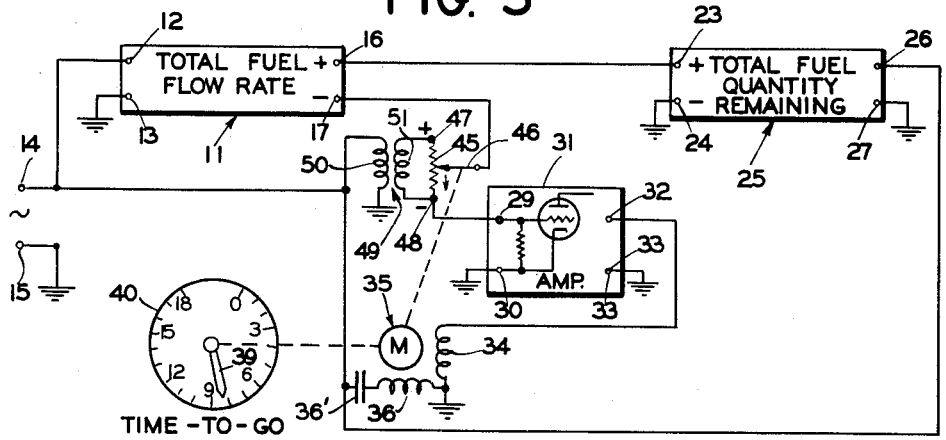
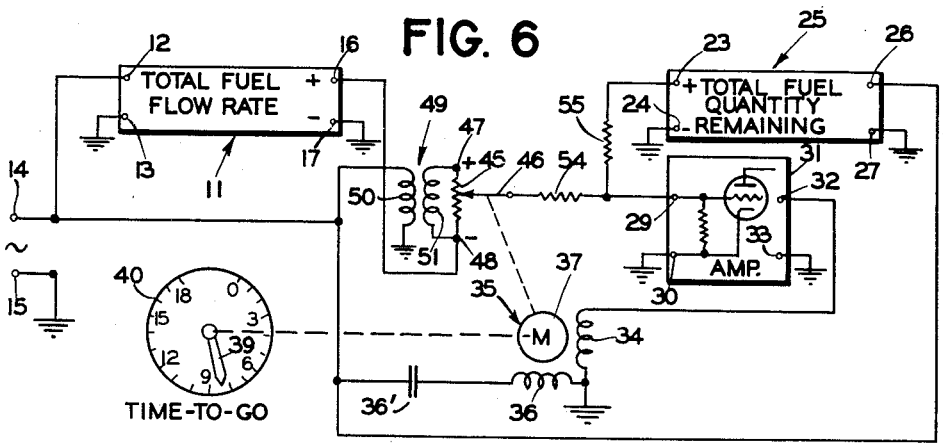
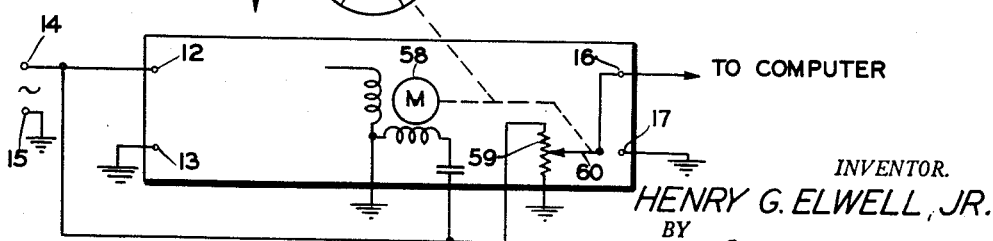
INVENTOR.
HENRY G. ELWELL, JR.
BY
Tyler S Roundy
ATTORNEY Oct. 11, 1960 H. G. ELWELL, JR 2,955,464
TIME OF FLIGHT INDICATOR
Filed Feb. 25, 1955 3 Sheets-Sheet 3
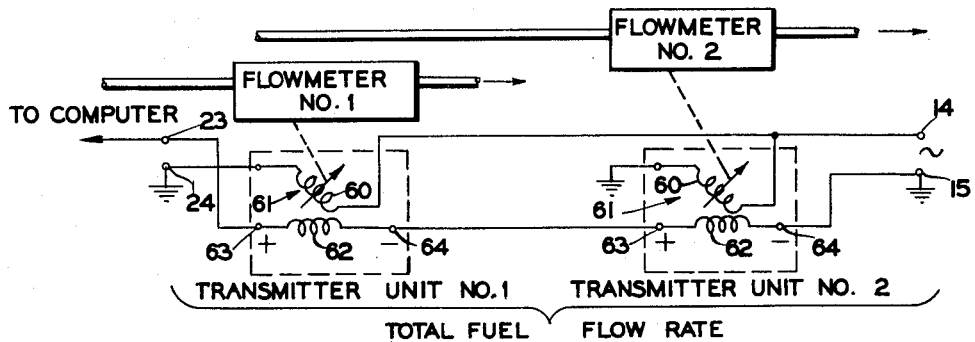
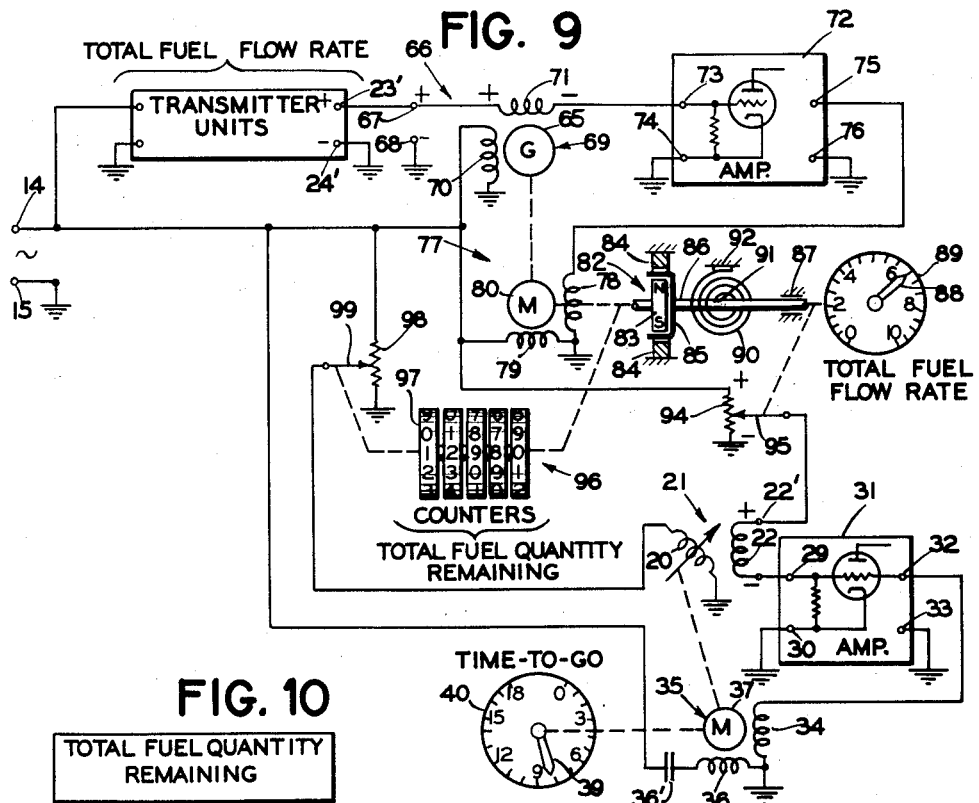
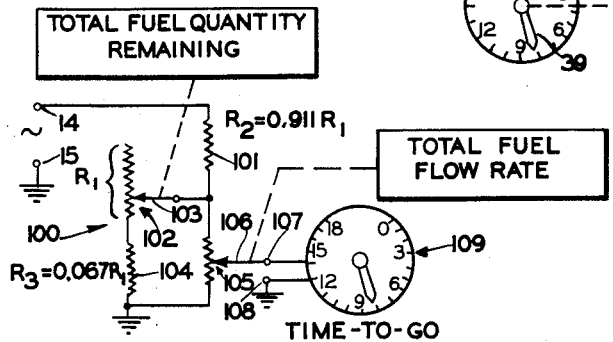
INVENTOR.
HENRY G. ELWELL, JR.
BY Tyler S Roundy
ATTORNEY United States Patent Office 2,955,464
Patented Oct. 11, 1960

2,955,464

TIME OF FLIGHT INDICATOR

Henry G. Elwell, Jr., Hackensack, N.J., assignor to The Bendix Corporation, a corporation of Delaware Filed Feb. 25, 1955, Ser. No. 490,620

4 Claims. (Cl. 73—198)

This invention relates to apparatus for controlling a device as a function of fluid data and particularly to control apparatus for providing an indication as a function of fluid data. The invention relates especially to apparatus for computing and indicating the time-to-go or the time-remaining-to-fly for a craft before its fuel supply has become completely exhausted.

In modern aircraft it is necessary for the pilot to determine frequently how much longer his aircraft will be able to fly based upon present conditions. This determination may be based upon the present rate of fuel consumption and the present fuel quantity remaining in the fuel tanks. In order to obtain the time-remaining-to-fly the pilot can observe the reading on the instrument dial which indicates the rate of fuel flow to the engine, or the reading on the instrument dial which indicates total fuel flow in the case of a multi-engine aircraft, and also can observe the reading on the instrument dial which indicates the total quantity of fuel present in all of the tanks. Then, by long-hand calculation or by slide rule, involving another unavoidable elapse of time, the pilot may divide the fuel quantity reading by the fuel flow rate reading to obtain the time-remaining-to-fly. Such a method not only involves a delay and the risk of human error but also is a time-consuming chore which adds to the many other essential duties of the pilot thereby reducing his efficiency and impairing safe operation of the craft.

It is an object of the invention to provide improved control apparatus.

It is another object of the invention to provide novel apparatus for controlling a device as a function of fluid data.

It is another object of the invention to provide novel apparatus employing one or more linear-output type rotatable transformers for computing the quotient of two quantities.

It is another object of the invention to provide novel accurate apparatus including a servomechanism for obtaining the mathematical quotient of two quantities at least one of which is derived by sensing a condition of a fluid.

It is another object of the invention to provide apparatus which may be operated in a completely automatic manner for dividing the value of one quantity by the value of another quantity where at least one of the quantities is derived by sensing a condition of a fluid.

It is a further object of the invention to provide novel apparatus for computing and indicating the time-to-go or the time-remaining-to-fly for a craft before its fuel supply becomes exhausted.

It is a further object of the invention to provide novel apparatus for providing an indication of the time-remaining-to-fly for an aircraft before its fuel supply becomes exhausted by dividing the fuel quantity available by the rate of fuel flow.

It is a further object of the invention to provide completely automatic apparatus for providing an accurate continuous indication of the time-remaining-to-fly for an aircraft by dividing the instantaneous fuel quantity left by the instantaneous rate of fuel consumption.

A further object of the invention is to provide an apparatus for accurately indicating to the occupants of an aircraft the period of time remaining for flight of the aircraft before decrease in the fuel supply is effected to a critical predetermined value by automatically dividing the gravimetric fuel or sensed measure of the weight of the fuel remaining by that of the gravimetric rate of fuel flow or sensed measure of the weight of the fuel flowing to the aircraft engine at the prevailing rate so as to provide an accurate indication of the time-to-go (time remaining) before the fuel supply is exhausted and which indication is unaffected by changes in fuel density due to causes such as wide variations in the prevailing temperature under those flight conditions normally to be expected in aircraft.

In accordance with one feature, time-to-go is computed with substantially no fuel density error by obtaining a first quantity (displacement or voltage) corresponding to gravimetric (pounds per hour) total fuel flow rate and a second quantity corresponding to gravimetric (pounds) total fuel quantity remaining and by dividing the second quantity by the first quantity.

Another feature obtains the time-to-go division by means of a servoed linear-output type Autosyn rotatable transformer.

Another important feature eliminates the need for fuel contents gauges as the means for obtaining total fuel quantity remaining and computes time-to-go by sensing the total fuel flow rate to provide at a computer station or indicator station a first quantity (voltage or displacement) corresponding to total fuel flow rate, and by next integrating at said station the total fuel flow rate to provide a second quantity at said station corresponding to total fuel quantity remaining, and by finally dividing the second quantity by the first quantity.

The foregoing and other objects and advantages of the present invention will appear more fully hereinafter from a consideration of the detailed description which follows, taken together with the accompanying drawings wherein certain embodiments of the invention are illustrated by way of example. It is to be expressly understood that the drawings are for illustration purposes only and are not to be construed as defining the limits of the invention.

In the drawings wherein like reference numerals refer to like parts,

Fig. 5 is a schematic circuit diagram of another form of time-to-go apparatus employing a self-balancing network comprising a servomechanism which includes a linear potentiometer connected for series operation;

Fig. 6 is a schematic circuit diagram of a modification of the apparatus of Fig. 5 wherein the linear potentiometer is connected for parallel operation;

Fig. 7 is a schematic circuit diagram of one form of apparatus for deriving from a conventional total fuel quantity gauge system a voltage which is a function of the total fuel quantity for use in the apparatus of Figs. 2, 4, 5 and 6;

Fig. 8 is a schematic diagram of one form of apparatus for deriving from conventional flowmeter transmitter apparatus employing linear-output type rotatable transformers a voltage which is a function of the total fuel flow rate for use in the apparatus of Figs. 2, 4, 5 and 6.

Fig. 9 is a schematic diagram of one manner of adapting a conventional total fuel quantity and total fuel flow rate indicator unit to obtain for a time-to-go computer a voltage proportional to total fuel quantity and a voltage proportional to total fuel flow rate, without depending upon the operation of a fuel contents gauge; and Fig. 10 is a schematic circuit diagram of one form of time-to-go apparatus not requiring a servomechanism in the computer portion.

Figure 1:
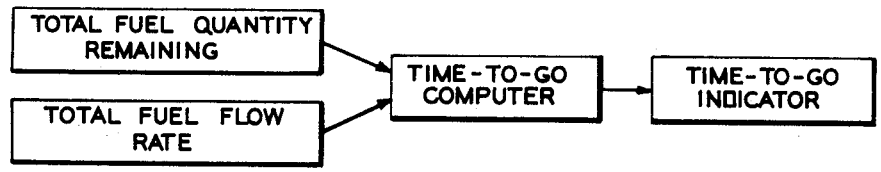
Fig. 1 is a block diagram of apparatus for providing an indication of a craft's time-to-go in accordance with the invention.

As represented in Fig. 1, one aspect of the present invention contemplates supplying as one input to a time-remaining computer an intelligence quantity, for example, a physical displacement or an electrical signal, which is a function of the total fuel quantity remaining in a fuel supply system, supplying as another input to the computer an intelligence quantity, for example a physical displacement or an electrical signal, which is a function of the total fuel flow rate in the system, and computing a quotient derived from the two inputs to obtain an output proportional to the time remaining or time-to-go before the fuel supply is exhausted. For visual indication, the output of the computer actuates a time-remaining or time-to-go indicator.

Figure 2:
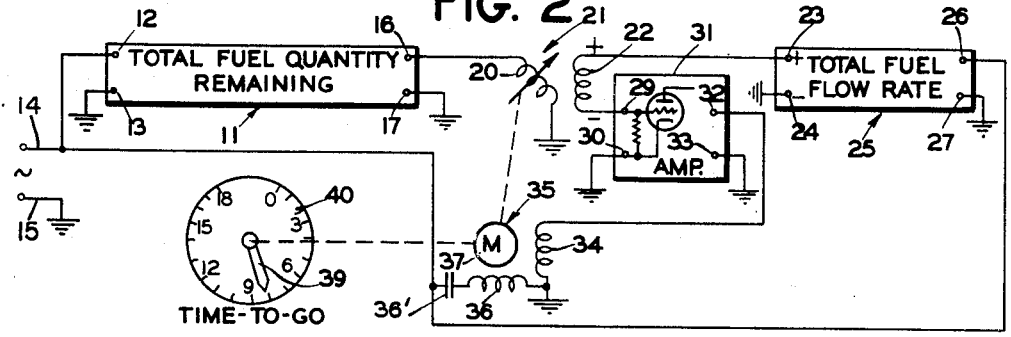
Fig. 2 is a schematic circuit diagram of one form of time-to-go apparatus employing a self-balancing network comprising a servomechanism which includes a linear-output type rotatable transformer connected for series operation in accordance with the invention.

In Fig. 2 there is indicated generally at 11 means for developing across a pair of output terminals 16, 17 an A.C. voltage which has an amplitude directly proportional to the total instantaneous fuel quantity remaining in all of the fuel tanks. The input terminals, 12, 13 of unit 11 are connected respectively to power supply terminals 14, 15 which are connected in turn to a 400-cycle source (not shown) of A.C. voltage. Terminal 15 is shown grounded for convenience. Unit 11 may comprise, for example, a conventional fuel gauge system for measuring the total quantity of fuel remaining in all of the fuel tanks. Representative constructions for unit 11 are described hereinafter in greater detail in connection with Figs. 7 and 9.

The output from unit 11 is connected across the rotatable primary winding 20 of a linear-output type rotatable transformer 21. One terminal of the fixed secondary winding 22 of the transformer is connected to one output terminal 23 of means 25 for developing across output terminals 23, 24 an A.C. voltage which has the same frequency as the output voltage from unit 11 and which has an amplitude directly proportional to the total instantaneous fuel rate of consumption from all of the fuel tanks. The input terminals 26, 27 of unit 25 are connected respectively to the A.C. supply terminals 14, 15. Relative instantaneous polarities are shown to represent one half cycle of operation. Unit 25 may comprise, for example, the series-connected or parallel-connected combination of outputs of all of the flow-meter transmitter units associated with the various fuel conduits. Representative constructions for unit 25 are described in greater detail in connection with Figs. 9 and 10.

The other terminal of transformer secondary winding 22 is connected to one of the input terminals 29, 30 of a conventional amplifier-phase discriminator 31 which has its output terminals 32, 33 connected to energize the control winding 34 of a servomotor 35. Motor 35 is preferably a 2-phase reversible squirrel-cage induction motor. The power winding 36 of motor 35 is connected across the A.C. supply terminals 14, 15. The rotor 37 of motor 35 is mechanically coupled through suitable reduction gearing to control the angular position of primary winding 20 with respect to secondary winding 22 and also to control the angular position of a pointer 39 associated with a dial 40 suitably calibrated in units of time-remaining or time-to-go such as minutes or hours.

When the total fuel flow rate is zero and hence the output voltage across terminals 23, 24 is zero, the rotor primary winding 20 is located in a null position perpendicular to the secondary winding 22 so that primary winding 20 induces no voltage in secondary winding 22 even though all of the fuel tanks are full to produce an output voltage across terminals 16, 17. Hence, no voltage is developed across the input terminals 29, 30 of amplifier 31 to excite the motor control winding 34. Rotor 37 is thus at rest holding primary winding 20 in its null position and pointer 39 is at its maximum scale position indicating the maximum time left to go.

Figure 3:
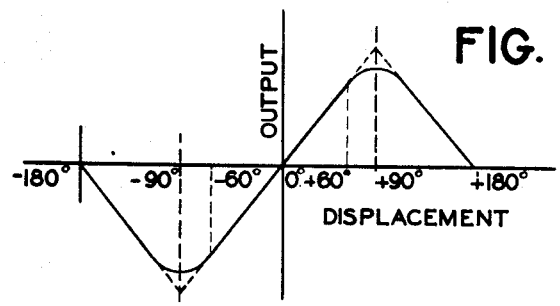
Fig. 3 illustrates graphically, when an A.C. voltage of constant amplitude is applied to the primary winding, the output voltage vs. rotor displacement characteristic for one form of linear-output rotatable transformer which may be employed in the apparatus of Figs. 2, 5, 9 and 10.

Turning briefly to Fig. 3, it will be noted that when the rotor of a linear-output type rotatable transformer is angularly positioned at a null position where the primary and secondary windings are effectively at right angles to each other or displaced 90° so that there is minimum coupling therebetween for minimum flux linkage of the secondary winding, then a voltage of substantially zero amplitude is induced in the secondary winding; when the rotor is angularly displaced 90° in either direction from its null position to a position where the windings are effectively parallel to each other so that there is maximum coupling therebetween for maximum flux linkage of the secondary winding, then a maximum voltage is induced in the secondary winding. For a predetermined range of rotor angular displacements, for example from zero to +60°, on one side of the null position the secondary voltage is in phase with the primary voltage and is directly proportional to the angle that the rotor is displaced from its null position. Similarly, for a range of rotor angular displacements from zero to —60° on the other side of the null position the secondary voltage is reversed in phase so as to be substantially 180° out of phase with the primary voltage and is directly proportional to the angle that the rotor is displaced from the null position. In other words, for a range of ±60° from null position the secondary voltage is a substantially linear function of the rotor angular displacement.

A preferred construction of linear-output type rotatable transformer is disclosed and claimed in the copending application of S. C. Lapidge and P. G. Yeannakis, U.S. Serial No. 435,482, filed June 9, 1954, and assigned to the same assignee as the present application. Other constructions of linear-output type rotatable transformers are disclosed in U.S. Patent No. 2,466,690 to R.S. Curry, Jr.

Returning to Fig. 2, the various relationships may be expressed mathematically as follows in accordance with one aspect of the present invention. Where $E_1$ is the voltage applied across primary winding 20 from the total fuel quantity unit 11, A is the angular displacement of primary winding 20 from its null position and K is a constant determined by the turns ratio, the voltage $E_2$ across secondary winding 22 may be expressed as $$E_2 = KE_1 A \tag{1}$$

If $E_3$ is the voltage developed across the output terminals 23, 24 of the total fuel flow unit 25, and $E_4$ is the resultant voltage appearing across the input terminals 29, 30 of amplifier 31, then $$E_4 = E_3 - E_2 \tag{2}$$

thus $$E_4 = E_3 - KE_1 A \tag{3}$$

When rotor primary winding 20 is positioned so that $E_2 = E_3$, then $E_4$ becomes zero, and solving for angle A $$A = \frac{K_1 E_3}{E_1} \tag{4}$$

Thus, since $K_1$ is a constant, angle A would directly be proportional to total fuel flow rate divided by total fuel quantity. That is, angle A would be proportional to pounds of fuel per hour divided by pounds of fuel whereby the pounds units cancel out mathematically so that angle A would be inversely proportional to the hours-to-go. The reciprocal of this relationship may be obtained so that hours-to-go and angle A are made directly proportional by arranging motor 35 to position pointer 39 at its maximum scale position corresponding to maximum or infinite time-to-go (i.e. maximum total fuel quantity and zero total flow rate) when the rotor primary winding 20 is positioned by motor 35 at the null or zero-secondary voltage position and having motor 35 rotate rotor winding 20 in one direction away from the null position as the fuel begins to be consumed and the time-to-go begins to decrease from its maximum value. When time-to-go has become zero motor 35 could be arranged to have positioned rotor winding 20 to a position which, for example is 60° away from its null or maximum time-to-go position.

The operation may be considered with the fuel tanks initially full producing maximum voltage in rotor primary winding 20 and with winding 20 in its null position resulting in zero secondary voltage. If fuel suddenly begins to be consumed at a particular total flow rate which is assumed constant for purposes of discussion, then a proportional voltage appears across output terminals 23, 24 and across the amplifier input terminals 29, 30. The motor control winding 34 thus becomes energized and the motor rotates at a speed corresponding to the amplitude of the amplified signal to turn, through the reduction gearing, the primary winding 20 sufficiently from its null position so that the primary winding voltage is now able to induce a voltage $E_2$ in secondary winding 22, such voltage having an amplitude tending to equal the amplitude of the total fuel flow voltage $E_3$ and substantially 180° out of phase with voltage $E_3$. Hence, for a given flow rate, the difference or error voltage $E_4$ would be reduced to zero and motor 35 and pointer 39 would stop except for the fact that the primary voltage $E_1$ at the same time is progressively decreasing at a uniform rate due to the continuing uniform total rate of fuel consumption. This uniform decrease in the primary voltage $E_1$ would tend to cause a corresponding uniform decrease in the secondary winding voltage $E_2$ below the constant amplitude of the total flow rate voltage $E_3$ and hence undesirably would tend to produce a difference or error voltage $E_4$ which progressively increased in amplitude as the fuel continued to be consumed at the given rate thereby progressively increasing the motor speed and rate of movement of pointer 39 as the fuel continued to be consumed. However, such condition is avoided since motor 35 also controls the angular position of primary winding 20 so that as fuel continues to be consumed winding 20 is progressively moved at a substantially uniform rate away from its null position thereby tending to increase the secondary voltage $E_2$, the opposing effects of the primary voltage and of motor 35 on secondary voltage $E_2$ causing the amplitude of the error voltage $E_4$ to remain substantially constant and the motor and pointer movements to be substantially uniform at a rate determined by the total fuel flow rate. As fuel continues to be consumed the motor and the rotor primary winding continuously seek a null position to produce zero error voltage, but the continued fuel consumption results in a continued decrease in the output voltage across terminals 16, 17 so that a null condition is not reached. It will be appreciated that if the total fuel flow rate should now increase for example, then the voltage $E_3$ would increase and the primary and secondary winding voltages would decrease more so that the error voltage $E_4$ would correspondingly increase. Accordingly, the rate of movement of motor 35, primary winding 20 and pointer 39 would increase in accordance with the new total fuel flow rate. It will thus be seen that there has been provided novel means for dividing total fuel quantity by total fuel flow rate to obtain an output which is directly proportional to time-remaining or time-to-go. If desired, the output of units 11 and 25 may be interchanged so that the output from unit 25 is applied across primary winding 20 and the output from unit 11 is connected in phase opposition with secondary winding 22, suitable means being provided such as an auxiliary fixed transformer having its primary winding excited from the line terminals 14, 15 and having its secondary winding connected to buck out the voltage output from unit 25 when the time-to-go is maximum and the total fuel flow rate is zero.

Figure 4:
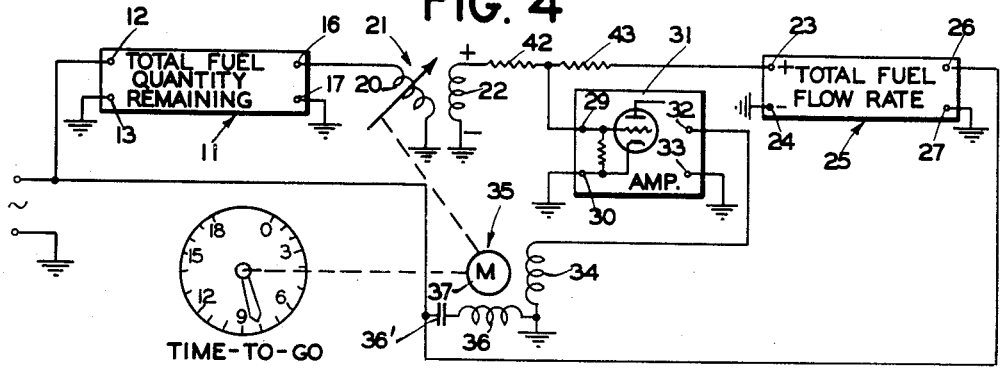
Fig. 4 is a schematic circuit diagram of a modification of the apparatus of Fig. 2 wherein the linear-output type rotatable transformer is connected for parallel operation.

In the system of Fig. 4 the system of Fig. 2 has been modified by connecting the secondary winding signal for parallel algebraic addition with the signal of opposite phase from terminals 23, 24 of unit 25 rather than for series algebraic addition as in Fig. 2. This may be accomplished by connecting one terminal of secondary winding 22 to the amplifier input terminal 29 via a series resistor 42 and by connecting terminal 23 to the amplifier input terminal 29 via a series resistor 43. The operation of Figs. 2 and 4 is substantially the same.

In Fig. 5 the time-to-go computer employs a linear variable resistance device such as a linear potentiometer 45 which has the position of its slider 46 controlled through reduction gearing by the servomotor 35. The full resistance 45 is connected across the secondary winding 51 of a fixed or locked transformer 49 having its primary winding 50 connected across the A.C. line terminals 14, 15. The voltage across terminals 47, 48 is substantially in phase with the voltage across terminals 16, 17 when present and substantially 180° out of phase with the voltage across terminals 23, 24. The A.C. voltages across terminals 16, 17, across terminals 23, 24 and across slider 46 and terminal 48 are added algebraically in series, and the resultant or error voltage is developed across the amplifier input terminals 29, 30. During normal operation of the system the voltage appearing across the portion of resistance 45 between slider 46 and terminal 48 depends upon the position of slider 46 as controlled by servomotor 35.

When the fuel tanks are full so that a maximum A.C. voltage appears across output terminals 23, 24 of unit 25, motor 35 positions pointer 39 at its maximum scale position corresponding to maximum or infinite time-to-go and also positions slider 46 at the upper end of resistance 45 at terminal 47 so that the full voltage across secondary winding 51 appears in circuit between slider 46 and terminal 48. Transformer 49 is designed so that the secondary winding voltage across terminals 47, 48 is made equal to the maximum voltage across terminals 23, 24 correspondisg to full-tank conditions. The total fuel flow rate is zero so zero voltage appears across output terminals 16, 17 of unit 11. Hence, at maximum time-to-go the error voltage appearing across amplifier input terminals 29, 30 is zero and thus motor 35 is at rest since the error voltage is the algebraic sum of the voltage across terminals 47, 48 and across terminals 23, 24, such voltages being equal in amplitude and 180° out of phase.

When fuel begins to be consumed at an assumed constant rate a corresponding voltage appears across terminals 16, 17 and the voltage across terminals 23, 24 begins to decrease so that an error signal is now developed across amplifier input terminals 29, 30. The resulting excitation of the motor control winding 34 causes motor 35 to turn at a speed corresponding to the magnitude of the error voltage to move slider 46 of potentiometer 45 downward from terminal 47, the algebraic sum of the voltage across terminals 16, 17 and of the decreased voltage between slider 46 and terminal 48 tending to equal the decreased voltage across terminals 23, 24. However, with continued uniform fuel consumption the voltage amplitude across terminals 23, 24 continues to decrease at a uniform rate so that the error signal does not decrease to zero but rather remains at a particular amplitude depending upon the rate of uniform fuel consumption, motor 35 continuing to rotate at uniform speed seeking a null condition so that through the reduction gearing the pointer 39 moves at a uniform rate down-scale and slider 46 moves at a uniform rate towards terminal 48. When time-to-go approaches zero motor 35 may position slider 46 at terminal 48.

It will be understood that if the total flow rate should increase for example, then the voltage across terminals 16, 17 would increase and the voltage across terminals 23, 24 would decrease so that the error voltage applied to amplifier input terminals 29, 30 would correspondingly increase. Accordingly, the rate of movement of motor 35, slider 46 and pointer 39 would increase in accordance with the new total fuel flow rate.

In Fig. 6 the system of Fig. 5 has been modified by connecting the signal from the series combination of output terminals 16, 17 and the portion of resistance 45 between slider 46 and terminal 48 for parallel algebraic addition with the signal from output terminals 23, 24 rather than for series algebraic addition as in Fig. 5. This may be accomplished by connecting slider 46 to the amplifier input terminal 29 via a series resistor 54 and by connecting output terminal 23 to amplifier input terminal 29 via a series resistor 55. The operation of Figs. 5 and 6 is substantially the same.

In Fig. 7 there is illustrated one manner of obtaining an A.C. voltage for the time-to-go computer which is directly proportional to the total fuel quantity in all of the fuel tanks. Unit 11 may comprise for example a conventional self-balancing capacitance-type fuel gauge system such as disclosed in detail in U.S. Patent No. 2,563,280 to C. R. Schafer et al. for measuring the total number of pounds of fuel remaining in all of the tanks. In the aforesaid Patent No. 2,563,280 there is provided for each fuel tank a capacitance-type measuring network self-balanced by a servomotor for providing an output displacement and indication directly proportional to the pounds of fuel remaining in the associated tank. Suitable means, such as a monitoring condenser totally immersed in the fuel at the bottom of the tank and connected effectively in parallel with the reference condenser of the network, may be provided so that the output displacement is compensated for changes in fuel dielectric constant or density. The servomotors for all of the tank networks control the value of respective variable impedance in a total fuel quantity totalizing network which is self-balanced by a totalizer servomotor which also positions a pointer 56 on a total fuel quantity dial 57. The motor 58 in Fig. 7 may be the totalizer servomotor or may be the individual self-balancing servomotor for one tank network in the case where the craft has only one fuel tank. The servomotor 58 may control the position of the slider 60 of a linear potentiometer 59 which may have its resistance connected across the A.C. supply terminals 14, 15, so that the A.C. voltage between slider 60 and ground, and hence the A.C. voltage between output terminals 16, 17, is directly proportional to the total fuel quantity in all of the tanks, preferably measured in gravimetric units such as pounds of fuel rather than volumetric units.

In Fig. 8 there is illustrated one manner of obtaining an A.C. voltage for the time-to-go computer which is directly proportional to the total rate of fuel flow from all of the fuel tanks. Unit 25 may comprise for example the combination of conventional aircraft fuel flowmeter transmitter units associated with the various engines. The flowmeters may be of the rotatable vane type, the Venturi type or of impeller-turbine momentum type for example. A suitable vane-type flowmeter transmitter unit for measuring mass fuel flow rate to displace a linear-output type rotatable transformer is disclosed in the copending application of H. G. Elwell, Jr., and S. Machlanski, U.S. Serial No. 395,450, filed December 1, 1953, now Patent No. 2,874,375. A suitable Venturi-type flowmeter transmitter unit for measuring mass fuel flow rate to displace a linear-output type rotatable transformer is disclosed in the copending application of J. E. Bevins and N. F. Hosford, U.S. Serial No. 273,372, filed February 26, 1952, now Patent No. 2,767,580, the aforesaid applications being assigned to the same assignee as the present application. Suitable impeller-turbine momentum type flowmeters for measuring mass fuel flow rate are disclosed in U.S. Patent No. 2,602,330 to P. Kollsman and in British Patent No. 717,897.

In Fig. 8 only two transmitter units are illustrated by way of example. The flowmeter of each transmitter unit angularly displaces the rotor primary winding 60 of its respective linear-output type rotatable transformer 61 in direct proportion to the mass rate of fuel flowing through the associated conduit 65. Each primary winding 60 is connected for excitation across the A.C. supply line terminals 14, 15. The secondary windings 62 of each transformer is connected in series between the output terminals 63, 64 of each transmitter. If the flowmeters have a dual deflection rate which requires electrical compensation for totalization purposes or if it is desired to extend effectively without phase reversal the linear output range of the transformer in each transmitter unit, then the secondary winding of a fixed transformer energized from the supply terminals may be employed in series with each secondary winding 62 as disclosed in the aforesaid application Serial No. 395,450. The output terminals 63, 64 of the transmitter units are connected for algebraic addition of the output voltage across each pair of terminals 63, 64. The connection may be for series summation as illustrated or for parallel summation of the kind indicated in Figs. 4 and 6. There thus appears across the output terminals 23, 24 an A.C. voltage having an amplitude which is directly proportional to the total rate of fuel being consumed from all of the fuel tanks.

Fig. 9 illustrates one manner of deriving at a fuel data indicator station, without depending upon the operation of a fuel contents gauge, both the A.C. voltage directly proportional to total fuel quantity remaining and also the A.C. voltage directly proportional to the total fuel flow rate. These voltages may be utilized in the computers of Figs. 2, 4, 5, or 6. The computer of Fig. 2 is employed in Fig. 9 by way of example. Applied across the input terminals 67, 68 of the indicator unit 66 is the resultant A.C. voltage which has been developed across terminals 23', 24', from the fuel flowmeter transmitter units and which is directly proportional to the total fuel flow rate, preferably measured in gravimetric units such as pounds of fuel per hour. Except for the addition of pick-off potentiometers 94 and 98, the indicator unit 66 is as disclosed and claimed in the aforesaid application Serial No. 273,372.

A continuously running rate generator 69 has its power winding 70 energized from the power line 14, 15 and has its output winding 71 connected in series opposition between the transmitter units and the input terminals 73, 74 of an amplifier 72 which has its output terminals 75, 76 connected to energize the control winding 78 of a continuously running A.C. induction motor 77 which has its power winding 79 energized from the power line 14, 15. The rotor 80 of motor 77 is mechanically coupled to drive continuously the rotor 65 of generator 69 at a speed directly proportional to the amplitude of the amplified error voltage. The voltage generated in output winding 71 is substantially 180° out of phase with the total fuel flow voltage which is developed by the combination of transmitter units and which appears across terminals 23', 24' and across terminals 67, 68. During normal operation, the amplitude of the bucking voltage developed in generator winding 71 follows but never quite equals the amplitude of the total fuel flow voltage across terminals 67, 68, the difference or error voltage developed across amplifier input terminals 73, 74 being directly proportional to the total fuel flow rate, whereby the speed of motor 77 is directly proportional to the total fuel flow rate, preferably the gravimetric total fuel flow rate.

Mounted for rotation on a shaft driven by motor 77 is the permanent magnet 83 of a conventional slip-coupling device 82. As illustrated, device 82 comprises a conventional magnetic drag-cup device having a stationary soft-iron annular core 84 to provide a return path for the flux and an aluminum or copper drag cup 85 mounted on a shaft 86 supported in suitable bearings 87. Shaft 86 is mechanically coupled to control the angular position of a pointer 88 with respect to a dial 89 calibrated in units of total fuel flow rate such as pounds of fuel per hour. A spiral hairspring 90 is provided which has a stationary outer end 92 and has its inner end secured to shaft 86. Spring 90 biases shaft 86 and pointer 88 to a zero position when the total fuel flow is zero with zero voltage across terminals 23', 24' and motor 77 and generator 69 at rest. During normal operation the torque developed in drag-cup 85, and hence the angular displacement of shaft 86 and pointer 88, is directly proportional to the rotational speed of motor 77 and to the total fuel flow rate.

In accordance with the invention means such as a linear pick-off potentiometer 94 may be provided for deriving from the angular position shaft 86 an A.C. voltage which is directly proportional to the total fuel flow rate. By connecting the full resistance of potentiometer 94 across the A.C. supply line 14, 15 and by arranging shaft 86 to move slider 95 upward away from the grounded terminal of potentiometer 94 as the total fuel flow rate increases, the A.C. voltage appearing between slider 95 and ground is made directly proportional to the total fuel flow rate, such voltage being supplied to the computer as described in connection with Fig. 2. If desired, a conventional self-synchronous transmitter and receiver synchro follow-up system may be interposed between shaft 86 and slider 95. Alternatively, if desired the total fuel flow rate voltage may be obtained from the input terminals 67, 68 by connecting terminal 67 directly with terminal 22' of the secondary winding 22 of rotatable transformer 21.

The continuously rotating rotor 80 of motor 77 also drives, through reduction gearing, the indicator wheels of a counter mechanism 96 or other suitable integrating device for providing an indication of the total fuel quantity remaining, preferably the gravimetric total fuel quantity remaining. In accordance with the invention, the ten thousands wheel 97 may be coupled to displace means such as the slider 99 of a pick-off potentiometer 98 which has its full resistance connected across the A.C. supply line 14, 15. As the total fuel quantity decreases the counter wheel 97 moves slider 99 downward closer to the grounded terminal of potentiometer 98, the A.C. voltage developed between sliler 99 and ground and applied across primary winding 20 being directly proportional to the total fuel quantity. Alternatively, if the direction of rotation of the counter mechanism is reversed the counter will indicate total fuel quantity consumed, the ten thousands counter wheel should be arranged to displace slider 99 in the same direction as previously described so as to retain between slider 99 and ground a voltage which is directly proportional to total fuel quantity remaining.

Fig. 10 illustrates one system for obtaining time-to-go without requiring a self-balancing network or servomechanism in the computer portion of the system. Connected across the A.C. supply terminals 14, 15 is a resistance network 100 comprising a fixed resistor 101 in series with a parallel combination of resistors 102, 104 and 105.

Resistor 102 is a potentiometer having a full resistance value of $R_1$ ohms, resistor 101 having a resistance value of $R_2$ ohms equal approximately to 0.911 times $R_1$, and resistor 105 having a resistance value of $R_3$ ohms equal approximately to 0.067 times $R_1$. The slider 103 of potentiometer 102 is displaced as a linear function of the total fuel quantity remaining preferably the gravimetric total fuel quantity remaining. For example, slider 103 may be displaced by the fuel quantity totalizer servomotor 58 of Fig. 7 or by one of the counter wheels in Fig. 9. The slider 106 of the high-resistance potentiometer 105 is displaced as a linear function of the total fuel flow rate, preferably the gravimetric total fuel flow rate. For example, slider 106 may be displaced by a total fuel flow rate indicator shaft such as shaft 86 in Fig. 9. Between slider 106 and ground and across output terminals 107, 108 there is developed an A.C. voltage having an amplitude directly proportional to the quotient total fuel quantity remaining divided by total fuel flow rate which is time-to-go. This voltage may be utilized to actuate suitable time-to-go indicating means represented by voltmeter 109.

Various modifications are possible within the scope of the present invention. For example, although gravimetric units are preferred, if desired the total fuel flow rate and the total fuel quantity remaining may be sensed in terms of volumetric units rather than gravimetric or mass units, so that the two fuel data inputs supplied to the time-to-go computer are proportional to such volumetric units. Moreover, the linear-output type rotatable transformers of Figs. 2, 4, 8 and 9 may be modified by winding the secondary winding on the rotor and making the primary winding stationary. If desired, one or both of the two inputs supplied to the time-to-go computer may be manually cranked in or set in to the computer by the pilot from data observed by the pilot, although completely automatic control is preferred.

Although certain embodiments of the invention have been illustrated and described in detail by way of example, it is to be expressly understood that the invention is not limited thereto. Specific values of voltages, angular displacements etc. have been given simply by way of example. Various changes may be made in the design and arrangement of the elements without departing from the spirit and scope of the invention as defined by the appended claims which will now be understood by those skilled in the art.

I claim:

1. In time-to-go measuring apparatus for use with a fluid supply system wherein withdrawal of fluid from fluid reservoir means causes the total fluid quantity remaining in the reservoir means to decrease, means responsive to the instantaneous total rate of fluid flow from the reservoir means for producing a first electrical signal having an instantaneous magnitude substantially proportional to said instantaneous total fluid quantity remaining and a second electrical signal having an instantaneous magnitude substantially proportional to said instantaneous total rate of fluid flow, electrical computer means for producing an output displacement substantially proportional to the mathematical quotient of the instantaneous magnitude of said first signal divided by the instantaneous magnitude of said second signal and substantially directly proportional to the mathematical quotient of said instantaneous total fluid quantity remaining divided by said instantaneous total rate of fluid flow, said computer means including a rotatable linear-output type transformer having relatively rotatable primary winding means and secondary winding means, means for coupling said first signal to said primary winding means so that a third signal is induced in said secondary winding means which is a function of said first signal, a self-balancing network including said rotatable transformer device, means for combining said second signal in opposition with said third signal to produce a fourth signal having a magnitude substantially proportional to the difference between the magnitudes of said second and third signals, means including a servomotor responsive to said fourth signal for producing relative rotation between said primary and secondary winding means to vary the magnitude of said third signal in a direction tending to decrease the magnitude of said fourth signal towards zero, the angular position of said servomotor being substantially proportional to said quotient of said instantaneous total fluid quantity remaining divided by said instantaneous total rate of fluid flow and which is substantially proportional to the instantaneous time-to-go before the total fluid quantity remaining has decreased substantially to zero, and indicator means controlled by the angular position of said servomotor for indicating said instantaneous time-to-go.

2. Apparatus for indicating the period of time remaining for flight of an aircraft before the fuel supply of initially known quantity for an engine of the aircraft has decreased to a critical predetermined value; said apparatus comprising means sensitive to the rate of fuel flow to the engine for producing a first signal varying with said rate of fuel flow, means for integrating said first signal and subtracting the integral from said known quantity to produce a second signal corresponding to the fuel remaining for use by said engine under prevailing conditions of flight of the aircraft, a computer device responsive to said signal producing means for producing a ratio of said first to said second signals, and indicator means operated by said computer device to indicate the aforesaid remaining period of time for flight of the aircraft.

3. The invention defined in claim 2 wherein said means for producing said first signal includes, a rate generator, motor means for energizing the generator in accordance with fuel flow rate, and means for varying the motor speed in accordance with fuel flow rate including means for electrically connecting the motor to the generator output and mechanically driving the generator by the motor, and wherein said means for integrating said first signal includes means for sensing rotation of the motor.

4. The invention defined in claim 3 wherein said first and second signals are electrical signals, a displaceable computing device, circuit means to couple said electrical signals to said computing device, said computing device including a servomotor to operate the displaceable computing device in response to a resultant signal output therefrom, and indicator means adjustably positioned by said servomotor to indicate the period of time remaining for flight of the aircraft before the fuel supply for the engine of the aircraft has decreased to the critical predetermined value.

References Cited in the file of this patent

UNITED STATES PATENTS

| | | |
|---|---|---|
| 1,602,444 | Naiman | Oct. 12, 1926 |
| 2,614,422 | Payne | Oct. 21, 1952 |
| 2,615,936 | Glass | Oct. 28, 1952 |
| 2,656,977 | Cummings | Oct. 27, 1953 |
| 2,769,338 | Hermanson | Nov. 6, 1956 |
| 2,772,049 | Griffith | Nov. 27, 1956 |